US008000322B2

(12) United States Patent  
Greener et al.

(10) Patent No.: US 8,000,322 B2  
(45) Date of Patent: Aug. 16, 2011

(54) CROSSBAR SWITCH DEBUGGING

(75) Inventors: James R. Greener, Ft. Collins, CO (US); Christopher P. Woody, Ft. Collins, CO (US); Robert McFarland, Murphy, TX (US); Tyler J. Johnson, Murphy, TX (US); Gregg Bernard Lesartre, Ft. Collins, CO (US); John W. Bockhaus, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 730 days.

(21) Appl. No.: 11/079,414

(22) Filed: Mar. 14, 2005

(65) Prior Publication Data

US 2006/0026468 A1 Feb. 2, 2006

Related U.S. Application Data

(60) Provisional application No. 60/592,474, filed on Jul. 30, 2004.

(51) Int. Cl.  
*H04L 12/50* (2006.01)

(52) U.S. Cl. ........ 370/386; 370/252; 370/286; 370/401; 702/118; 714/718; 714/724; 365/201

(58) Field of Classification Search .................... 714/39, 714/45, 724, 725, 726, 734, 742, 799, 30; 370/360, 244, 246, 250, 258–257, 401, 386, 370/389, 395.1, 400, 422–428, 463, 252; 398/45, 50, 56; 710/1, 8, 104, 126, 131, 132; 365/201, 185; 716/16; 712/29  
See application file for complete search history.

(56) References Cited

U.S. PATENT DOCUMENTS

| | | | | |
|---|---|---|---|---|
| 5,189,665 A | * | 2/1993 | Niehaus et al. | 370/248 |
| 5,625,780 A | * | 4/1997 | Hsieh et al. | 710/316 |
| 5,982,753 A | * | 11/1999 | Pendleton et al. | 370/252 |
| 6,141,344 A | * | 10/2000 | DeLong | 370/360 |
| 6,189,140 B1 | * | 2/2001 | Madduri | 717/128 |
| 6,445,682 B1 | * | 9/2002 | Weitz | 370/257 |
| 6,587,965 B1 | * | 7/2003 | Shaeffer et al. | 714/28 |
| 6,697,359 B1 | * | 2/2004 | George | 370/357 |
| 6,721,313 B1 | * | 4/2004 | Van Duyne | 370/386 |
| 6,850,852 B1 | * | 2/2005 | Ferguson et al. | 702/67 |
| 6,892,248 B2 | * | 5/2005 | Thayer | 710/2 |
| 7,035,228 B2 | * | 4/2006 | Baumer | 370/258 |
| 7,051,180 B2 | * | 5/2006 | Downer et al. | 711/173 |
| 7,184,916 B2 | * | 2/2007 | Resnick et al. | 702/118 |
| 7,200,151 B2 | * | 4/2007 | Manter | 370/462 |
| 7,209,476 B1 | * | 4/2007 | Colloff et al. | 370/360 |
| 7,245,587 B2 | * | 7/2007 | Phaal | 370/244 |
| 2002/0027908 A1 | * | 3/2002 | Kalkunte et al. | 370/389 |
| 2004/0085972 A1 | * | 5/2004 | Warren et al. | 370/401 |
| 2004/0205404 A1 | * | 10/2004 | Johnson | 714/30 |
| 2005/0027920 A1 | * | 2/2005 | Fitzsimmons et al. | 710/317 |
| 2005/0141429 A1 | * | 6/2005 | Jayakrishnan et al. | 370/236 |
| 2009/0024833 A1 | * | 1/2009 | Deneroff et al. | 712/29 |

* cited by examiner

*Primary Examiner* — Aung S Moe  
*Assistant Examiner* — Vinncelas Louis

(57) ABSTRACT

A crossbar switch having a plurality of ports that allows a debug process to be performed on the switch using one of the plurality of ports to output chip status information. The switch uses a debug block to store chip status information.

14 Claims, 4 Drawing Sheets

CROSSBAR SWITCH DEBUGGING

CROSS-REFERENCE

This application claims priority to U.S. Provisional application No. 60/592,474, filed Jul. 30, 2004.

BACKGROUND

Computers and computer components communicate using either serial or parallel data transmission. Parallel data transmission consists of sending several bits simultaneously, over separate channels, while serial data transmission consists of sending data bits one at a time over a single channel. While parallel transmission allows for high speed transmission between components that are in close proximity to each other, it is often not conducive to data transmission over longer distances. Serial transmission offers several advantages for transmission over longer distances (e.g., lower cost as only one channel is required). One technique used to capture the advantages of both data transmission methods is to convert parallel data to serial data for transmission over a channel and then convert the serial data back to parallel data. In order to accomplish this without unduly limiting the transfer rate, a channel with sufficient bandwidth may be used for the data transmission.

In response to this need for higher bandwidth data communication architectures, data communication architechures such as the SERDES (serial/deserializer) architecture were developed. SERDES is a protocol to encode and decode data according to a predefined scheme (e.g., eight-bit/ten-bit encoding). The encoded data is communicated over one or more communication channels from the serializer to a corresponding deserializer for decoding. Using the SERDES architecture, the bandwidth of data communications between cooperating computer components is increased.

Crossbar switches are often used to provide switching in high bandwidth data communication architectures such as SERDES. Crossbar switches are used to interconnect devices that are in communication within a computer system. The basic function of a crossbar switch is to receive data from one device and route it to another device. The crossbar switches are commonly formed on application specific integrated circuits (ASICs). The ASICs are generally packaged on a chip (e.g., silicon) having a plurality of pins through which connection is made to the elements on the chip.

It is common practice to test the ASICs to verify proper functionality of the crossbar switch. Various testing techniques have been employed to test ASICs at the chip level. These testing techniques typically involve the use of a dedicated debug port formed on the ASIC. Typically, the functionality of the various elements contained on the ASIC is monitored by connecting the output of the dedicated debug port to a monitoring device, such as a logic analyzer. However, this technique has several drawbacks. Because an additional port is required to act as the dedicated debug port, space on the chip is consumed. Additionally, input/output pins are required to be dedicated to the dedicated debug port. After verifying the functionality of the ASIC, the debug port and associated input/output pins are normally not used again, making the debug port an inefficient use of chip resources.

SUMMARY

A crossbar switch is provided having a plurality of ports, such as input/output (I/O) ports. A debug process can be performed on the switch using one of the plurality of ports to output chip status information. The switch generally uses a debug block to store chip status information. In one embodiment, the debug block is coupled to a debug bus, which is used to communicate the status information to a selected port where it is output.

In an exemplary embodiment, the crossbar switch debug process comprises selecting an output port on the crossbar switch, communicating status information to the selected output port, and outputting the status information via the selected output port. In an exemplary embodiment, the information is output in serial format in accordance with the SERDES protocol.

BRIEF DESCRIPTION OF THE DRAWINGS

For the purpose of illustrating the invention, there is shown in the drawings one exemplary implementation; however, it is understood that this invention is not limited to the precise arrangements and instrumentalities shown.

DETAILED DESCRIPTION

Illustrative Computing Environment

Figure 1:
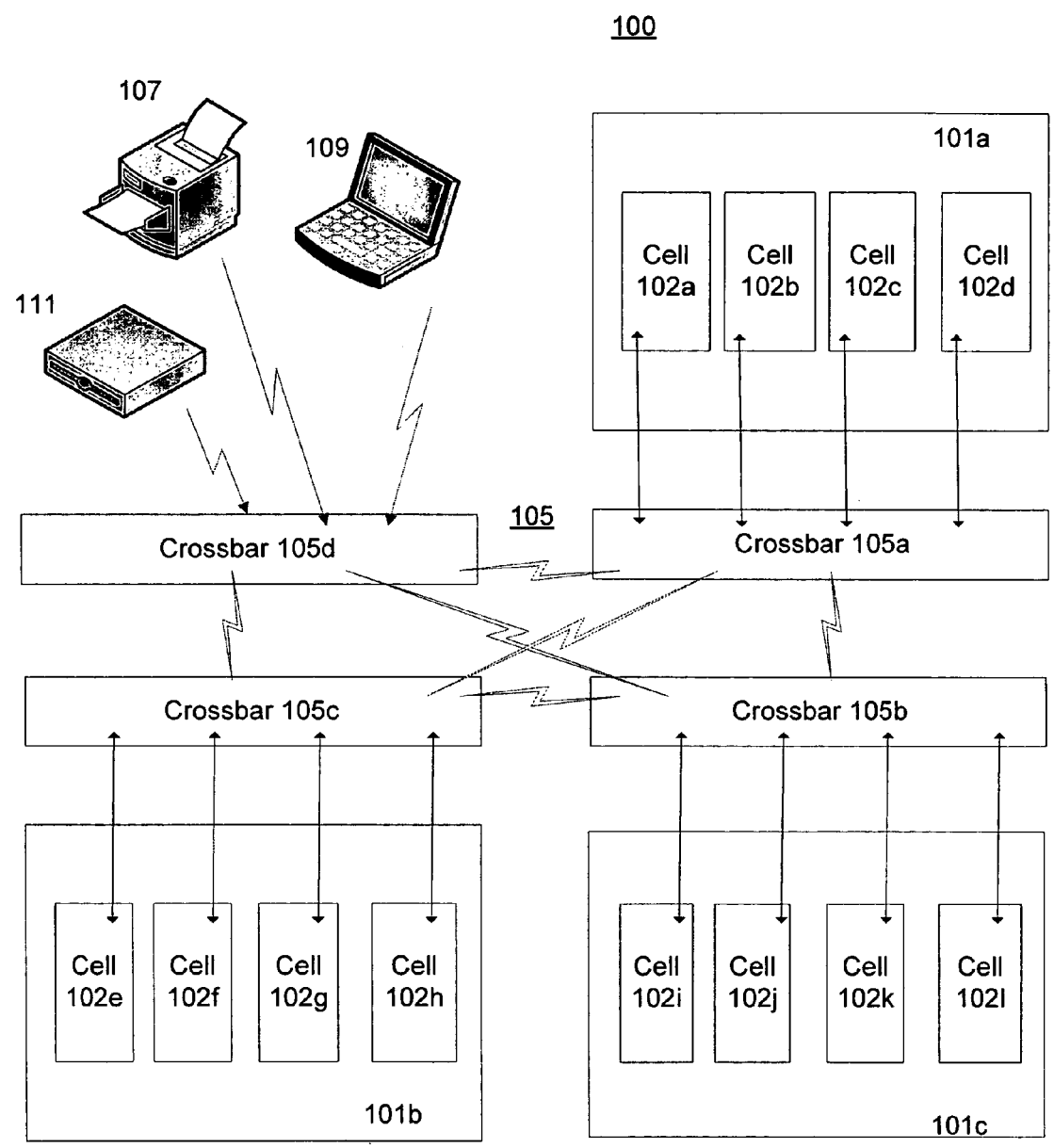
FIG. 1 is block diagram illustrating an exemplary computer system upon which one implementation of the current invention can operate.

Referring to FIG. 1, an exemplary computing system 100 is shown in which the crossbar switch in accordance with the present invention can operate. FIG. 1 illustrates a scalable, partitionable computer system that includes a plurality of elements or cells. The cells can be configured to form one or more individual logical or virtual machines, referred to as partitions. An example of this type of computing system is the Superdome® system manufactured by Hewlett-Packard (Palo Alto, Calif.).

In the exemplary embodiment shown in FIG. 1, three partitions 101a, 101b, and 101c are shown, with each partition containing four cells. It is understood, however, a number of partitions could be contained within the system, limited only by the total number of cells available, and the number of cells each partition contains could range in number from one cell per partition to the total number of cells in the system all contained within a single partition. Each partition is a logical separation from the remainder of the system.

In the exemplary embodiment shown in FIG. 1, the first partition 101a includes four cells 102a, 102b, 102c, 102d; the second partition 101b includes four cells 102e, 102f, 102g, 102h; and the third partition 101c includes four cells 102i, 102j, 102k, 102l. Partitionable systems such as the system shown in FIG. 1 are typically configured such that each cell within a partition has the ability to communicate with other cells within the same partition, or often with other cells in other partitions.

Communication between partitions and between cells within a partition occurs via one or more crossbar switches 105a, 105b, 105c, 105d, collectively 105. Additionally, communication from any particular cell and various other devices on the system (e.g., printers 107, user interfaces 109, media drives 111) is also done via the crossbar switches 105. The crossbar switches 105 can comprise various number of ports, and are typically formed on ASICs. The relatively complex nature of the computer environment shown in FIG. 1 creates a need to have the ability to verify the performance of the crossbar switches 105 to ensure proper system performance.

Overview

Figure 2:
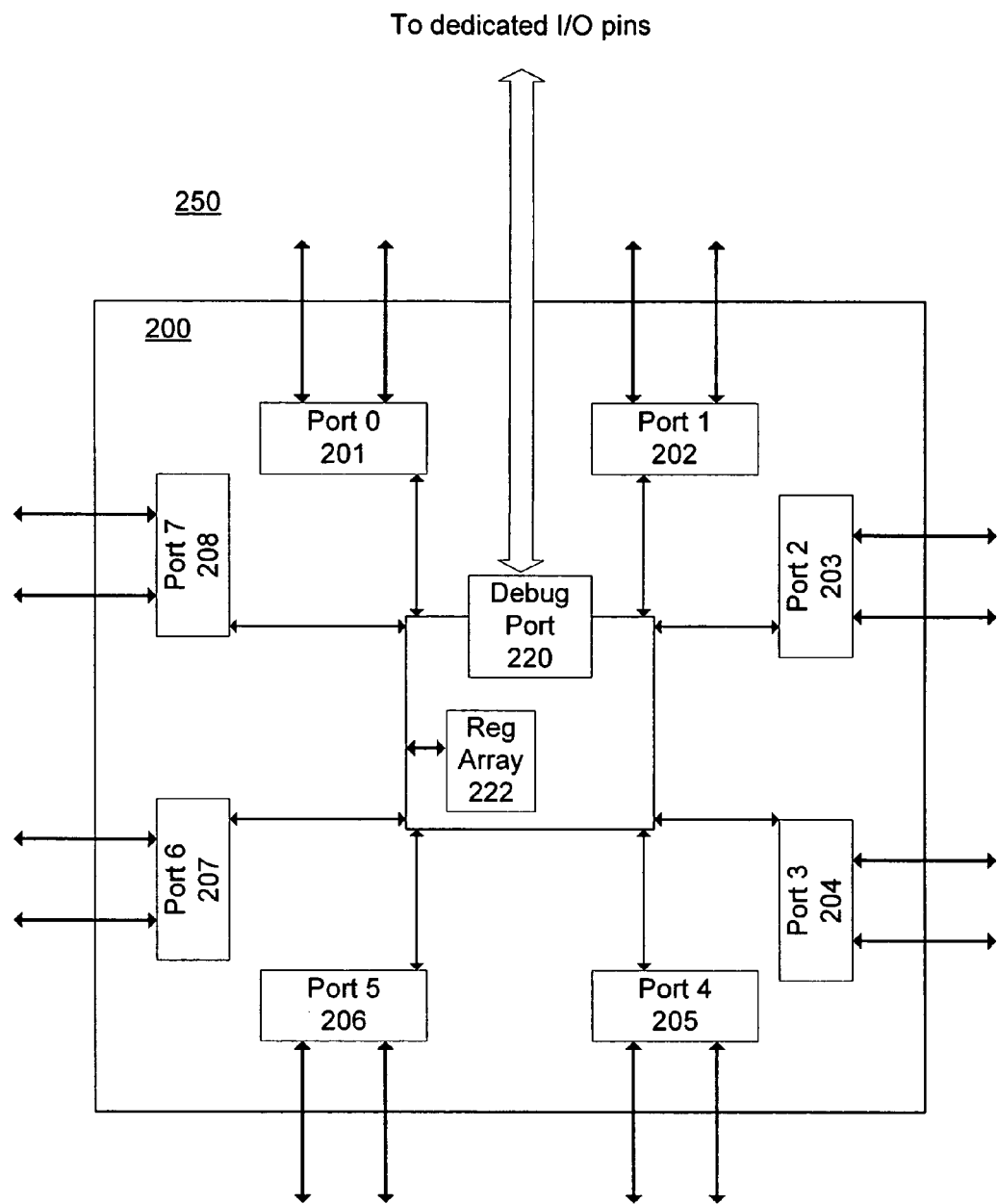
FIG. 2 is a block diagram illustrating an application specific integrated circuit (ASIC) containing an 8 port crossbar switch.

Crossbar switches 105 typically comprise a plurality of input/output ports which are coupled to various devices within the computer environment. Referring to FIG. 2, a conventional 8 port crossbar switch 200 is shown. The switch 200 contains eight ports 201, 202, 203, 204, 205, 206, 207, 208. The switch itself is typically a "smart" switch, meaning the switch can operate to route data in accordance with instructions provided. The switch 200 is generally formed on an ASIC 250. The ASIC 250 may also contain a number of register arrays, memory modules, processor cores, etc. A single register array 222 is shown for simplicity. It is, however, understood that a number of register arrays may be contained on the ASIC 250.

The input/output ports (201-208) are coupled to a debug port 220. This configuration is typically known as a "debug ring." The register array 222 is also coupled to the debug port 220. The debug port 220 is coupled to a plurality of I/O pins on the ASIC 250. In order to test the function of the ASIC 250, a logic analyzer is typically coupled to the I/O pins for the debug port 220. Special instructions are often used to halt the system operation at a particular point to allow the contents of a register (e.g., register array 222) to be read from the debug port 220. Data can be sent from any of the register arrays included on the ASIC 250 or from any of the crossbar ports (201, 202, 203, 204, 205, 206, 207, 208) to the debug port 220, where it is then generally output to a logic analyzer (shown as 325 in FIG. 3), typically using a custom designed interface for coupling the logic analyzer to the debug port. This technique of debugging ASIC devices, such as crossbar switches, requires a dedicated bus path to allow status information to be provided from any register or any port to a plurality of I/O pins. It also requires dedicated I/O pins, as well as an interface to couple a logic analyzer to the I/O pins. All of these items add to chip overhead and reduce available pin resources, which is often a scarce commodity.

Figure 3:
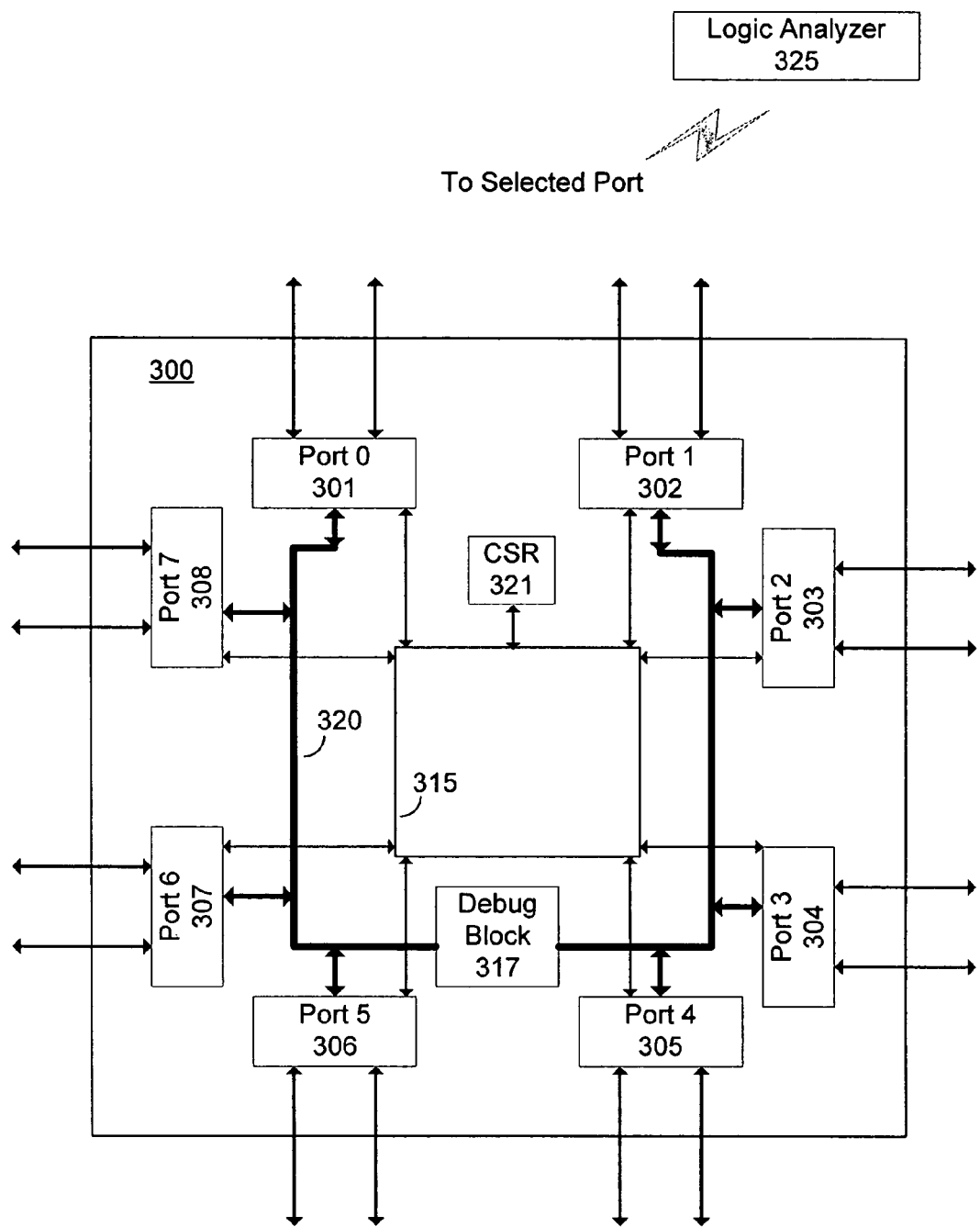
FIG. 3 is a block diagram of an exemplary ASIC containing an 8 port crossbar switch in accordance with one embodiment of the present invention.

Debug Port Configuration in Accordance with an Exemplary Embodiment of the Invention The debug port as shown in FIG. 3 uses a novel technique to conserve pin resources and chip scale package area. FIG. 3 shows an exemplary embodiment of an 8-port crossbar switch 300 with debugging capabilities integrated into the existing chip structure using one of the eight existing ports. In an exemplary embodiment, the switch resides on an ASIC and may contain any number of register arrays, memory modules, processor cores, etc., which, for the sake of simplicity, are not shown in FIG. 3. The exemplary crossbar switch 300 comprises eight ports 301, 302, 303, 304, 305, 306, 307, 308. Each port is capable of communication with every other port via the crossbar switch interconnect fabric, shown on FIG. 3 as 315. The interconnect fabric 315 is typically a low latency fabric. The interconnect fabric 315 permits data received at any one input port to be routed to a desired output port.

Additionally, a debug bus 320 resides in the crossbar switch 300. The debug bus 320 typically has a higher latency than the interconnect fabric 315. In the embodiment shown, debug bus 320 is coupled to each of the ports 301, 302, 303, 304, 305, 306, 307, 308 and also to a debug block 317. Debug block 317 is capable of storing data, and may comprise a register array, an area of random access memory or other similar form of data storage. The debug bus 320 allows data to be sent from any of the ports 301, 302, 303, 304, 305, 306, 307, 308 to the debug block 317 or, additionally, from the debug block 317 to any off-chip location. Data indicating the chip state at any given time or under any particular conditions, referred to as status information, is stored in the debug block 317.

The data read from the debug block 317 via the debug bus 320 is communicated via an existing port using the communication protocol under which the crossbar is configured to communicate (e.g., serial communication in accordance with SERDES). In order to allow for communication from the debug block 317, one of the plurality of ports is configured to function when desired as a debug port. This is accomplished using a local per-port configuration to instruct a particular port to write to, and read from, the debug bus 320. In the illustrated embodiment, any port on the crossbar switch 300 can be used to create the debug port.

In the exemplary embodiment, the port selected to act as the debug port is unavailable to transmit other data. This results from configuring the port to read from, and write to, the debug bus 320 instead of the switch interconnect fabric 315. However, since normal crossbar operation typically has one or more unused or spare ports, such a limitation is not critical to system performance. In an alternative embodiment, the selected port may be reconfigured to act as a typical data port if it is not longer desired to have a debug port, or if it is desired to change the debug port to a different port. Port configuration can be accomplished using a control register, for example, control and status register (CSR) 321, that maintains configuration information for the ports. By writing to the CSR 321, the selected debug port can be reset to function normally if desired.

Figure 4:
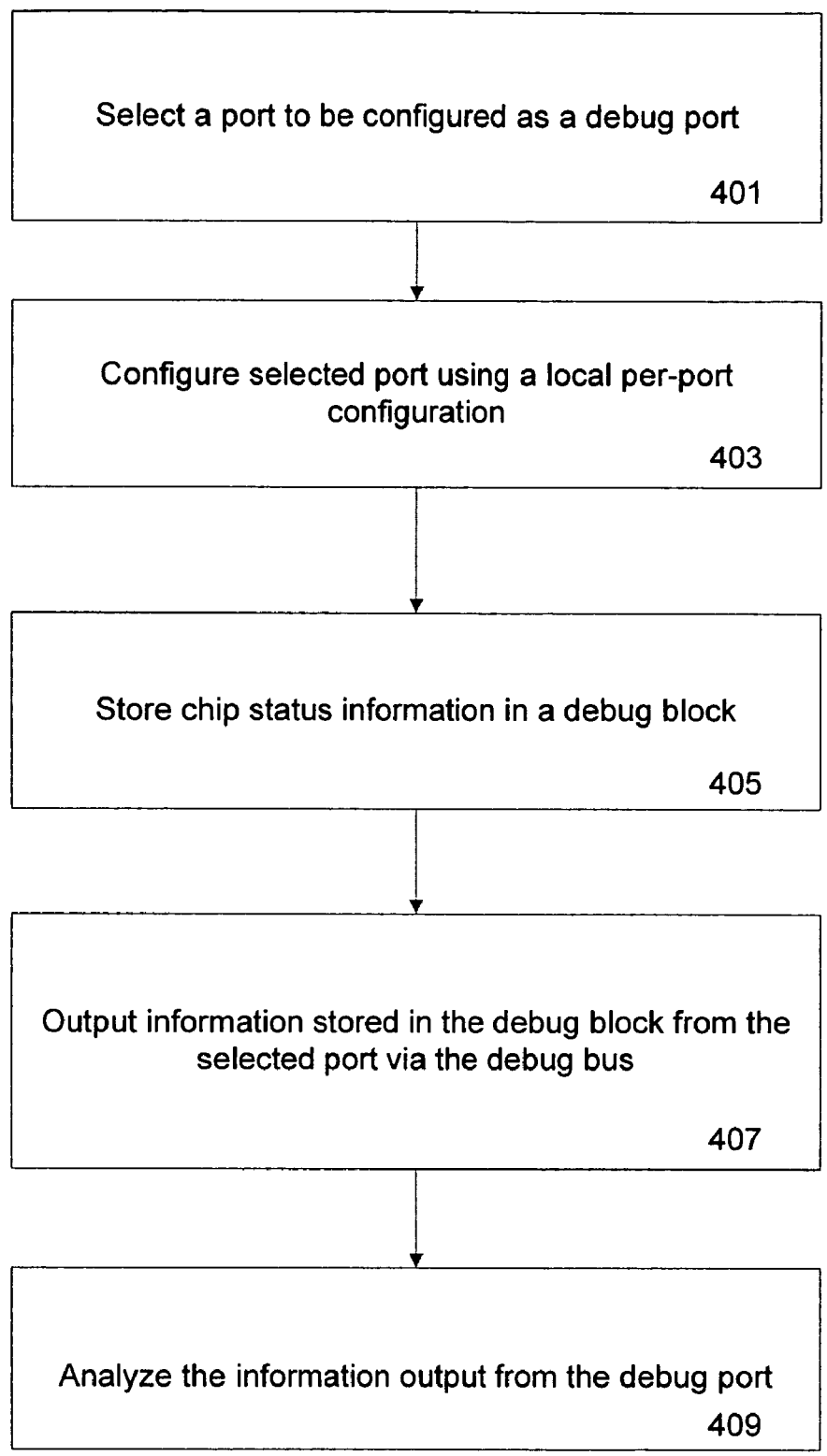
FIG. 4 is a flow chart illustrating the steps of an exemplary process for testing a crossbar switch.

FIG. 4 illustrates the steps involved in performing debug testing on a crossbar switch in accordance with an exemplary implementation of the present invention. A port is selected on a crossbar switch to use for debug purposes (step 401). The selected port is configured using a standard local per-port configuration process to instruct the port to read from the debug bus (step 403). During system operation, status information regarding chip operation is stored in a debug block by being sent via the debug bus (step 405). This information is read via the port selected to act as a debug port (step 407). The information read via the debug port is can then be analyzed by providing it to a logic analyzer (325 in FIG. 3) or alternatively by providing the information directly to a processor capable of analyzing the status data.

In this manner, the crossbar switch performance is verified during all phases of operation without the need for a resource consuming debug port as used in the prior art. By configuring an existing port to function as a debug port, no additional I/O pins are required, and no additional chip space is required. Additionally, the data retrieved can be output in accordance with existing data transmission protocols (e.g., SERDES), thus enabling it to be transmit/processed in the same manner and at the same bandwidth as functional data.

Although exemplary embodiments of the invention have been described in detail herein, a variety of modifications to the embodiments described will be apparent to those skilled in the art from the disclosure provided above. Thus, the present invention may be embodied in other specific forms without departing from the spirit or essential attributes thereof and, accordingly, reference should be made to the appended claims, rather than to the foregoing specification, as indicating the scope of the invention.

What is claimed is:

1. A crossbar switch comprising:
  a plurality of input/output (I/O) ports;
  a debug block for storing chip status information;

a control register storing configuration data for the I/O ports, said configuration data assigning each said I/O port to function as either a crossbar port or a debug port;

a crossbar switch interconnect fabric coupleable to said plurality of I/O ports for use in communication between a number of said I/O ports presently assigned to function as crossbar ports according to said configuration data; and a debug bus coupled to said debug block and to each said I/O port, for outputting said status information stored in said debug block via one of said I/O port presently assigned to function as said debug port according to said configuration data.

2. The crossbar switch as set forth in claim 1, wherein said plurality of ports comprises eight ports.

3. The crossbar switch as set forth in claim 1, wherein said switch resides on an ASIC.

4. The crossbar switch as set forth in claim 1, wherein said plurality of ports are serial ports.

5. The crossbar switch as set forth in claim 1, wherein the data stored in the control register can be changed to change an assignment of at least one said I/O port.

6. A system comprising:

a crossbar having a plurality of I/O ports; a debug block residing in said crossbar;

a control register residing in said crossbar, said control register storing configuration data for the I/O ports, said configuration data assigning each said I/O port to function as either a crossbar port or a debug port;

a crossbar switch interconnect fabric coupleable to said plurality of I/O ports for use in communication between a number of said I/O ports presently assigned to function as crossbar ports according to said configuration data; and a debug bus coupled to said debug block and to each said I/O port, wherein status information is stored in said debug block and communicated via said debug bus from said debug block to one of said I/O port presently assigned to function as said debug port according to said configuration data.

7. The system as set forth in claim 6 wherein said status information is output in accordance with the SERDES protocol.

8. The system as set forth in claim 6 further comprising a logic analyzer coupled to said selected port for analyzing said status information.

9. The system as set forth in claim 6, wherein the data stored in the control register is alterable.

10. A method for debugging a crossbar device having a crossbar switch interconnect fabric and a plurality of input/output (I/O) ports comprising:

storing configuration data for the I/O ports in a control register, said configuration data assigning each said I/O port to function as either a crossbar port or a debug port;

storing status information for said crossbar device in a debug block of the crossbar device;

communicating the status information via a debug bus from the debug block to one of a said selected I/O port presently assigned to function as said debug port according to said configuration data and outputting said status information via said selected I/O port presently assigned to function as said debug port according to said configuration data.

11. The method as set forth in claim 10, wherein said status information is output as serial data.

12. The method as set forth in claim 11, wherein said serial data is in accordance with the SERDES protocol.

13. The method as set forth in claim 10, wherein the crossbar device is in an ASIC.

14. The method as set forth in claim 10, further comprising: reading said information from said debug block through said selected port.

* * * * *

UNITED STATES PATENT AND TRADEMARK OFFICE
CERTIFICATE OF CORRECTION

PATENT NO.        : 8,000,322 B2
APPLICATION NO.   : 11/079414
DATED             : August 16, 2011
INVENTOR(S)       : James R. Greener et al.

It is certified that error appears in the above-identified patent and that said Letters Patent is hereby corrected as shown below:

In column 6, line 21, in Claim 10, after "of" delete "a".

In column 6, line 21, in Claim 10, after "said" delete "selected".

In column 6, line 23, in Claim 10, delete "data and" and insert -- data; and --, therefor.

In column 6, line 24, in Claim 10, after "said" delete "selected".

Signed and Sealed this
Tenth Day of July, 2012

David J. Kappos
*Director of the United States Patent and Trademark Office*